United States Patent [19]

Meads

[11] 3,870,356
[45] Mar. 11, 1975

[54] ADJUSTABLE MATERIAL HANDLING FORK

[75] Inventor: Charles D. Meads, Hellam, Pa.

[73] Assignee: DICO Company, Inc., York, Pa.

[22] Filed: Nov. 7, 1973

[21] Appl. No.: 413,701

[52] U.S. Cl. ............................ 294/67 A, 214/731
[51] Int. Cl. ............................................. B66c 1/22
[58] Field of Search. 294/63 R, 67 R, 67 A, 67 AA, 294/67 AB, 67 BB, 67 BC, 87 R, 87.22, 87.24, 110 R; 214/654, 655, 658, 730, 731

[56] References Cited
UNITED STATES PATENTS

| 2,323,810 | 7/1943 | Fontaine | 214/655 |
|---|---|---|---|
| 2,610,890 | 9/1952 | Jaeger | 294/110 R |
| 2,869,742 | 1/1959 | Hileman | 214/654 |
| 3,421,643 | 1/1969 | Barbee | 214/730 X |
| 3,495,722 | 2/1970 | Schroder | 294/87 R X |
| 3,545,636 | 12/1970 | Yarbrough | 214/731 |
| 3,664,534 | 5/1972 | Hunter | 214/730 |
| 3,684,113 | 8/1972 | Roller | 214/731 X |

Primary Examiner—Evon C. Blunk
Assistant Examiner—Johnny D. Cherry
Attorney, Agent, or Firm—Parmelee, Miller, Welsh & Kratz

[57] ABSTRACT

An expandable fork for transferring a plurality of objects from a location in which they are in close proximity to a location where they are spaced apart. A pair of tine units are pivotally suspended from a frame such that, when they are loaded, they may be held close together or allowed to spread apart.

7 Claims, 3 Drawing Figures

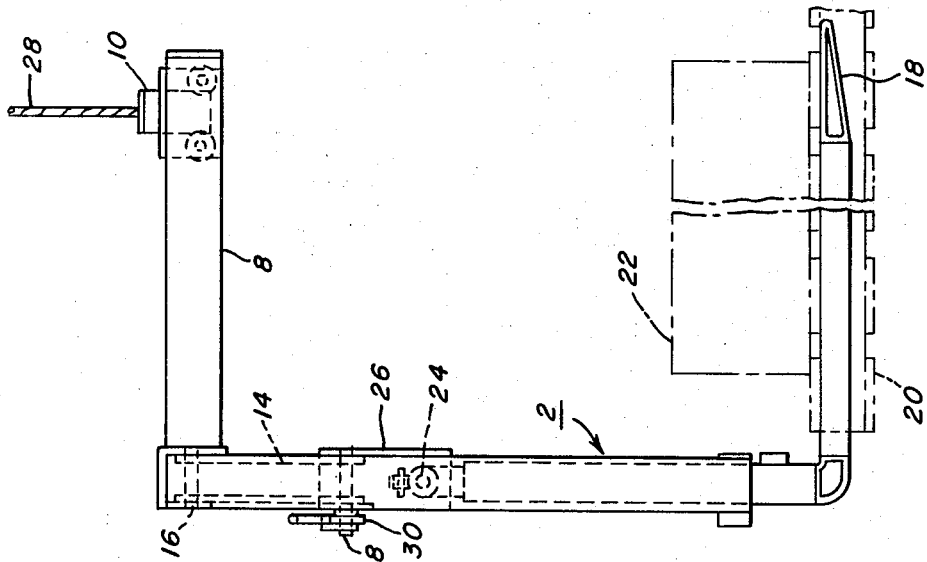
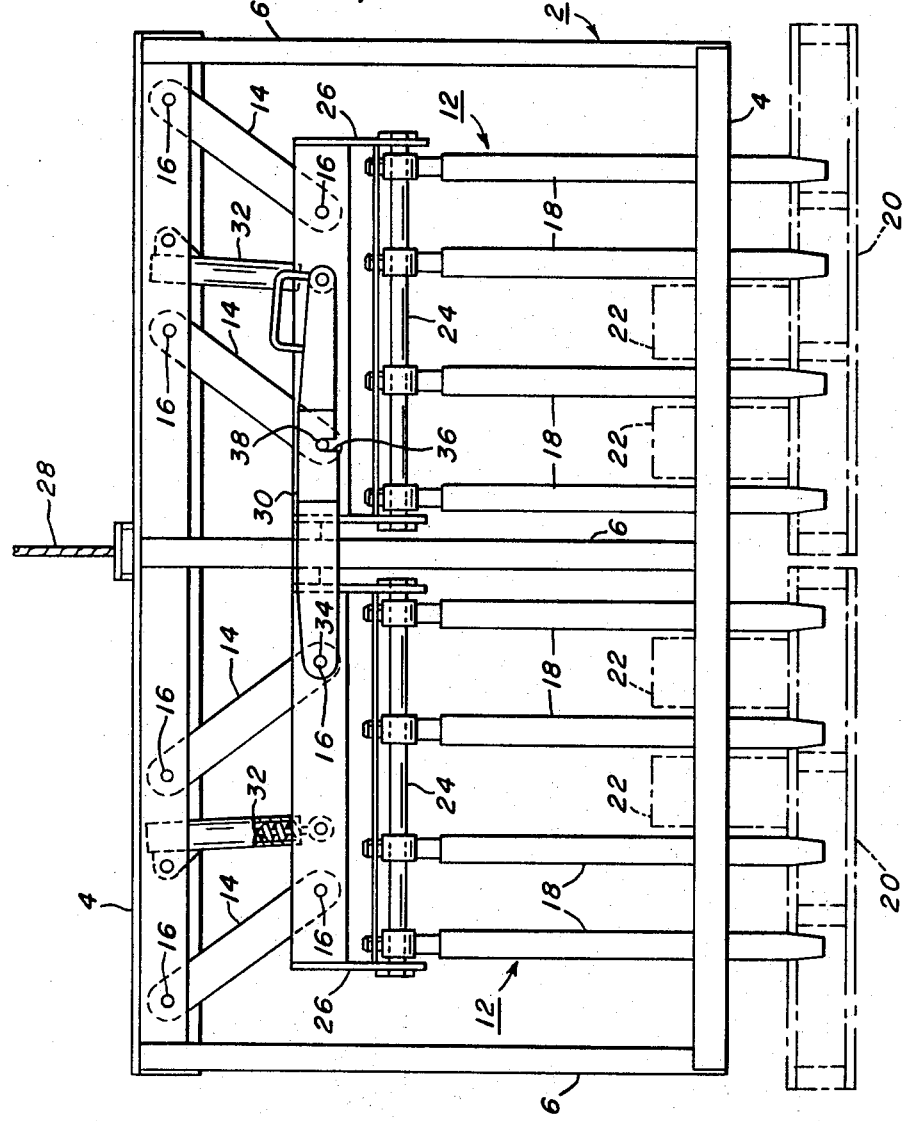

ADJUSTABLE MATERIAL HANDLING FORK

BACKGROUND OF THE INVENTION

1. Field of the Invention

This invention relates generally to material handling forks, and more specifically to forks for moving a plurality of objects from a location in which they are one distance apart to a location in which they are a second distance apart.

2. PRIOR ART

When articles are transported on pallets by truck, economy requires that the pallets by placed as close together as possible on the truck. It is also more economical to remove more than one pallet from the truck at a time, if it is possible. However, when large multi-tined forks are used to remove two or more pallets from a truck at one time, the pallets must necessarily be set on the ground, or whatever location to which they are to be moved, in the same close relationship in which they were loaded on the truck. Often after being unloaded from the truck, the pallets will be moved to another location by smaller lift trucks. Smaller lift trucks are often preferred and utilized at building construction sites, particularly where the trucks must pass through narrow doorways of buildings under construction. These trucks require a certain amount of space in which to maneuver, and it is more convenient for the operation of these trucks if the pallets are spaced apart a certain distance. Also, such trucks may have probes which are used to warn of proximity to narrow doorways and other objects. Such probes may be damaged if the lift truck attempts to handle pallets which are too close together. It is often advantageous to have space between the pallets in order to facilitate access to the loads on the pallets for inspection and other purposes.

For the above reasons, pallets are sometimes unloaded in close proximity, and the large fork is then used to engage one of the pallets and drag it away from the other pallet, in order to space the pallets apart a desired distance. However, since the forks were not designed to perform in such a manner, such dragging can cause damage to the forks, and is also an inefficient method of spacing the pallets.

The present invention provides a fork which can be used to unload objects from a location in which they are in close proximity, and transfer them to, and deposit them at another location in which they are spaced apart.

SUMMARY OF THE INVENTION

The present invention is an expandable fork for transferring a plurality of objects between a location in which they are a first distance apart, such as close together on a truck, and a location in which they are a second distance apart, such as spaced for temporary storage. The fork includes a frame suspendable from a lifting means, such as an hydraulic arm or a cable, and also a pair of tine units each having a plurality of tines. At least one support member secures each tine unit to the frame such that when the fork rests upon a surface, the tine units are in a proximate lateral relationship corresponding to the lesser distance and the frame is supported by the tine units, and when the fork is suspended, the tine units move relative to the frame and to each other and are suspended in a remote lateral relationship corresponding to the greater distance. Means, such as a latch, are included for releasably securing the tine unit in the proximate lateral relationship when the frame is suspended. Thus the fork may be used, for example, to remove a pair of pallets which are in close relationship on a truck. When the latch is released, the tine units will assume a position a greater distance apart, and the pallets may be set down in this spaced relationship.

BRIEF DESCRIPTION OF THE DRAWINGS

FIG. 1 is a front elevation view of a material handling fork of the present invention, showing the tine units in the second position.

FIG. 2 is a side elevation view of the material handling fork of the present invention, with the tine units in the second position.

DESCRIPTION OF THE PREFERRED EMBODIMENT

Figure 3:
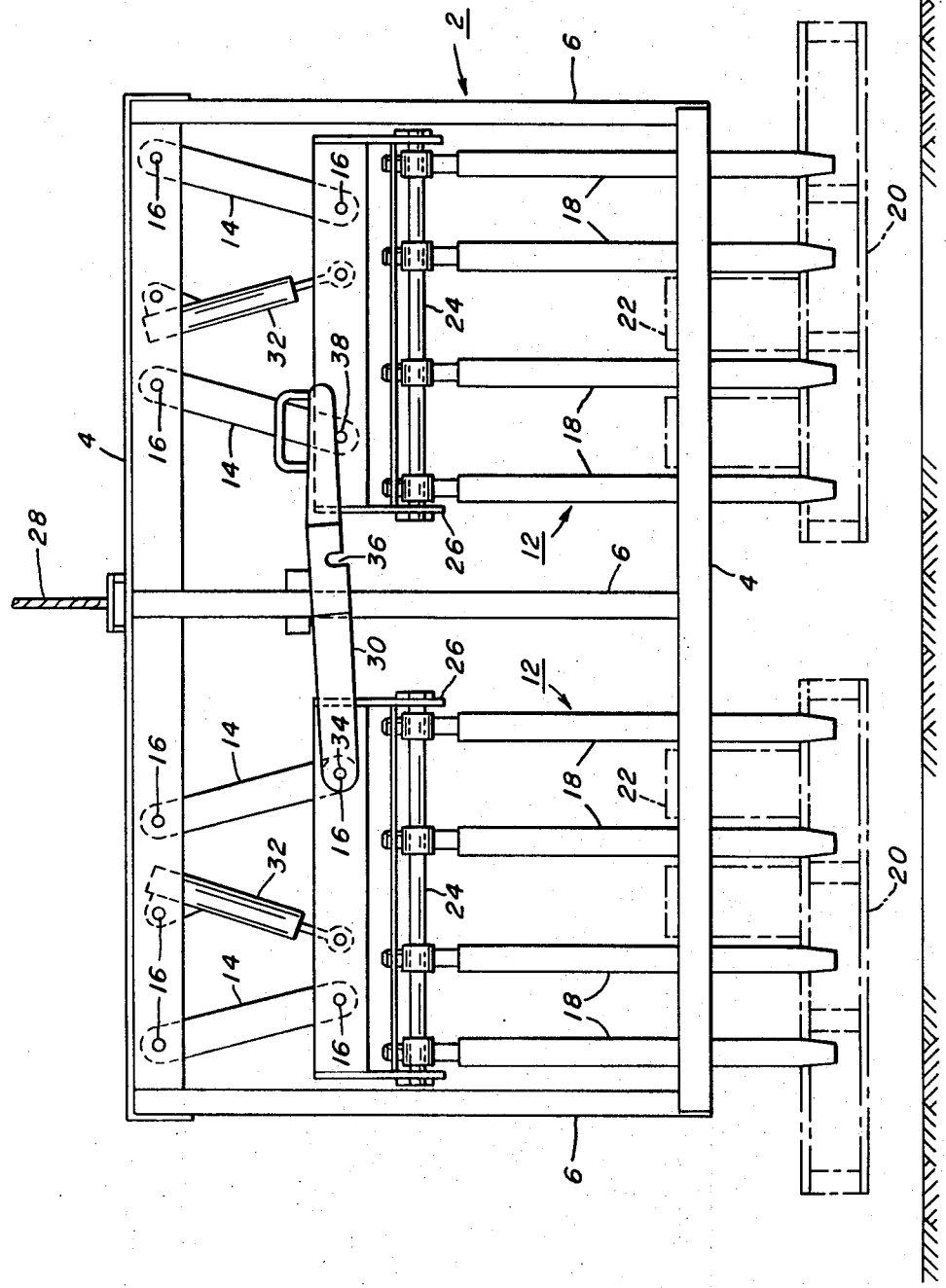
FIG. 3 is a view similar to FIG. 1, with the fork suspended and the tine units in the first position.

The present invention can best be understood by reference to the accompanying drawings. As shown in FIG. 1, a frame 2 is formed from a plurality of horizontal members 4 and vertical members 6, welded together to form a solid unit. The frame 2 also includes suspendable members 8 from which the entire fork may be suspended by, for example, a trolley 10 which is movable along the suspendable members 8.

A pair of tine units 12 are secured to the frame 2 by support members 14. These support members 14 may be, for example, parallel links which are secured to the frame 2 by pivotal mountings 16. The tine units may be of various conventional construction and may have varying numbers of individual tines 18. Preferably, the tine units each have approximately four L-shaped tines 18 adapted to engage and support standard pallets 20, and thus carry a load 22 on the pallets 20. The tines may be movably mounted on a bar 24 so as to allow for adjustment of the distance between the tines, and also the number of tines. The bar 24 holding the tines 18 may be suspended from a tine unit frame 26. The tine unit frame 26 also has pivotal mountings 16 by which the support members 14 are attached to the tine unit frame 26.

In the preferred embodiment, when the frame 2 is suspended from a lift means such as a cable 28, as shown in FIG. 3, the tine units 12 assume a first position by the force of gravity. The tine units 12 drop relative to the frame 2 and are spaced apart from each other in a remote lateral relationship. When the fork is rested on the ground, the tine units 12 swing arcuately relative to the frame 2, on the bars 14, to a second position in which they are higher relative to the frame and are in a proximate lateral relationship. A latch or other suitable means 30 may be provided to hold the tine units in the second position when the fork is lifted.

From the previous description, the operation of the present invention may easily be understood. With the fork in the configuration shown in FIG. 1, the tines 18 are inserted into pallets 20 which are in close relationship on a truck or other surface. The fork is then lifted to remove the pallets 20 and their load 22 from the truck. When the truck is in the position to which the load 22 is to be moved, the fork is set on the ground and the latch 30 is released. When the fork is lifted, the tine units then swing by force of gravity to the first position, in which they are spaced apart, and the load may then be set downn in this spaced relationship. After the fork has been removed from the pallets 20, the fork may be rested on the ground in order to return the tine units to the second position. The above-described operation may then be repeated.

To assist the movement of the tine units from the first position to the second position, resilient means such as springs 32 may be provided, which may be pivotally attached to both the frame 2 and the tine unit frame 26 to urge the tine unit 12 upward and into the second position. These springs 32 may be designed either so as to balance the weight of the tine units 12 so that the tine units 12 will swing downward under a load but will return to the upper position when the load is removed, or such that the tine units 12 will remain downward without a load, but will be easily moved to the upper position.

The latch 30 may be of various designs, and is shown in the drawings to be of a simple, manually operated design. The latch 30 is pivotally secured to the first tine unit 12 at a point 34 and has a notch 36 which is adapted to engage a pin 38 on the second tine unit 12. The latch 30 is longer than the distance between the pivot point 34 and the notch 36 so that the latch continues to rest on pin 38 when the tine units 12 are in the first position. Thus, when the tine units 12 are raised to the second position, the latch 30 automatically falls over the pin 38 and secures the tine units 12 in this position.

The fork, as shown, is designed primarily for use in unloading a truck in which pallets are located in a position close together and depositing them in a spaced relationship at a second location. It can be seen that the orientation of the pivot bars 14 may be changed so that the tine units 12 would assume a position close together by the force of gravity, and would be forced upward and apart by the springs 32 when they were not loaded. Such a configuration could be beneficial in performing the latter operation.

In the embodiment shown in the drawings, the pivotal mountings 16 on the frame 2 are laterally offset from the pivotal mountings 16 on the tine units 12 so that each support member 14 is disposed at an angle to the vertical throughout the limits of lateral travel of the tine units 12. The springs 32 are arranged such that the points of pivotal connection of each spring 32 are disposed at an angle to the vertical throughout the limits of lateral travel of the tine units 12. This angle will always be oppositely inclined to the angle defined by the support members 14 of the tine unit 12 to which the spring 32 is connected.

It should be noted that other embodiments of the linkage between the frame 2 and the tine units 12 may be used. For example, if it is desired to have the tine units move linearly rather than arcuately from the first position to the second position, lost-motion linkages may be incorporated into support members 14.

I claim:
1. An expandable fork for transferring a plurality of objects from a location in which they are a lesser predetermined distance apart to a location in which they are a greater predetermined distance apart, which fork comprises:
   a suspendable frame;
   first and second tine units, each of said units including a plurality of horizontal tines capable of supporting a load;
   a plurality of support members, at least one of which members pivotally secures each tine unit to the frame such that, when the fork rests upon a surface, the tine units are in a proximate lateral relationship corresponding to the lesser predetermined distance and the frame is supported by the tine units, and when the fork is suspended, the tine units move relative to the frame and to each other and are suspended from the frame in a remote lateral relationship corresonding to the greater predetermined distance; and
   means for releasably securing the tine units in the proximate lateral relationship when the frame is suspended.

2. The expandable fork as defined in claim 1 wherein the means for releasably securing the tine units comprises a latch pivotally attached to the first tine unit and adapted to engage a portion of the second tine unit.

3. The expandable fork as defined in claim 1 including resilient means connecting the frame and each tine unit, which resilient means urge the tine units toward the proximate lateral relationship.

4. The expandable fork as defined in claim 1 wherein the support members comprise a set of parallel links pivotally interconnecting each tine unit to the frame such that, in moving from the first lateral relationship to the second lateral relationship, the tine units move arcuately relative to the frame.

5. The expandable fork as defined in claim 4 wherein the points of pivotal connection of each link are laterally offset so that each link is disposed at an angle to the vertical throughout the limits of lateral travel of the tine units.

6. The expandable fork as defined in claim 5 including resilient means connecting the frame and each tine unit, which resilient means urge the tine units toward the proximate lateral relationship.

7. The expandable fork as defined in claim 6 wherein the resilient means pivotally connect each tine unit to the frame, and are arranged such that the points of pivotal connection of each resilient means are disposed at an angle to the vertical throughout the limits of lateral travel of the tine units, and further arranged such that the angle defined by the resilient means is oppositely inclined to the angle defined by the parallel links of the tine unit to which it is connected.

\* \* \* \* \*